R. ELLIOT.
Cultivator.

No. 51,817. Patented Jan 2, 1866.

Witnesses:

Inventor

UNITED STATES PATENT OFFICE.

RICHARD ELLIOT, OF PLAINFIELD, NEW JERSEY.

IMPROVEMENT IN COMBINED PLOW AND SCRAPER.

Specification forming part of Letters Patent No. 51,817, dated January 2, 1866.

*To all whom it may concern:*

Be it known that I, RICHARD ELLIOT, of Plainfield, in the county of Somerset and State of New Jersey, have invented a new and Improved Combination of a Plow and Scraper; and I do hereby declare that the following is a full, clear, and exact description thereof, which will enable those skilled in the art to make and use the same, reference being had to the accompanying drawings, forming part of this specification, in which—

Figure 1:
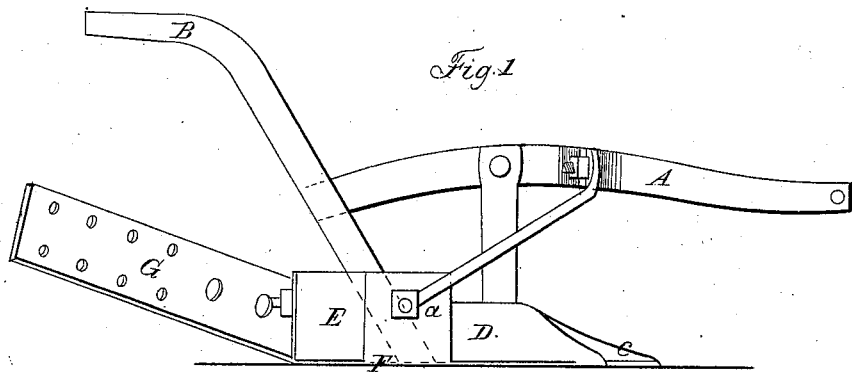
Figure 2:
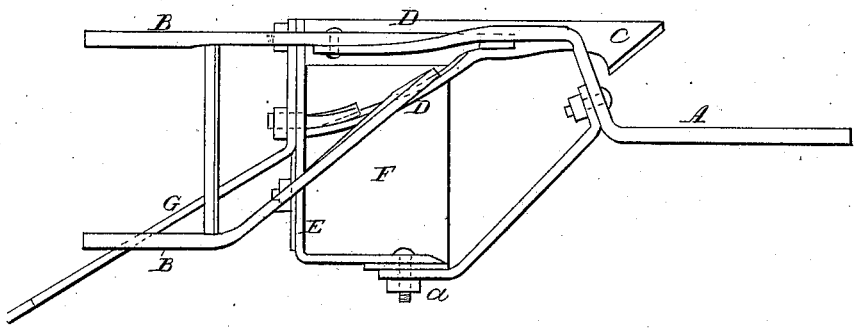

Figure 1 is a side view of my invention; Fig. 2, a plan or top view of the same.

Similar letters of reference indicate corresponding parts.

This invention relates to a new and improved combination of a plow and scraper designed for ditching, grading, &c.

The invention consists in attaching to a plow a scraper and grading-bar arranged in such a manner that said parts may be adjusted to suit the different kinds of work required to be done, the device at the same time being simple and capable of being constructed at a moderate cost.

A represents the beam of the plow; B B, the handles; C, the share, and D D' the mold-board and landside, the mold-board being quite shallow—that is to say, of a moderate height—and extending obliquely backward, so as to form a V with the landside, as shown in Fig. 2, the lower ends of the handles being attached to the landside and mold-board.

E represents a bar, which is bent in the form of a right angle, and is secured to the rear ends of the landside and mold-board by bolts and nuts arranged in such a manner that it may be readily detached when necessary. This right-angular bar E has a bottom, F, attached to it by bolts a, and this bar E, with the bottom F, forms a scraper to receive the earth turned up by the share C.

In grading the earth is conveyed from an eminence or prominence, it being taken off by the plow, and is deposited in a hollow or depressed portion of the land. In discharging the earth from the scraper the rear of the plow is raised, the bearing being on the point of the share. By this arrangement ditches may be filled and ground leveled and graded in a perfect manner, as the earth, in places where prominent, may be plowed or taken off, deposited in the scraper, or taken up by it and conveyed to the hollow or low places and there deposited.

In cases where it is not necessary to convey the earth the bottom F of the scraper is detached, and the bar E will serve as a drag or leveler, and in making ditches the bar and bottom are both detached and a bar, G, is attached to the rear ends of the landside and mold-board. This bar, in ditching, has an angular or an inclined position, so as to throw or force the dirt at one side as it is loosened or plowed up by the plow. Two of these bars G may be used, one at each side, if it is desired to have both sides of the ditch inclined, and I design to have the bar G adjustable, so that it may be inclined in a greater or less degree, and also placed in a horizontal position, if desired, so as to throw the earth outward from the plow.

The whole arrangement is extremely simple and efficient, may be constructed at a moderate cost, and the parts above specified adjusted and applied with the greatest facility to suit the different kinds of work to be performed.

Having thus described my invention, I claim as new and desire to secure by Letters Patent—

1. The scraper composed of the bar E and bottom F, applied to or combined with a plow, to operate substantially as and for the purpose set forth.

2. The bar G, in combination with the plow, substantially as and for the purpose specified.

The above specification of my invention signed by me this 3d day of October, 1865.

RICHARD ELLIOT.

Witnesses:
M. M. LIVINGSTON,
C. L. TOPLIFF.